United States Patent
Riedl

[11] 3,846,499
[45] Nov. 5, 1974

[54] MANUFACTURE OF HYDROCARBYL HYDROPEROXIDE

[75] Inventor: Peter A. Riedl, Wien, Austria

[73] Assignee: Texaco Inc., New York, N.Y.

[22] Filed: Oct. 22, 1970

[21] Appl. No.: 83,156

[52] U.S. Cl. ............................................. 260/610 B
[51] Int. Cl. ............................................ C07c 73/06
[58] Field of Search ................... 260/610 B, 610 A

[56] References Cited
UNITED STATES PATENTS
2,796,439  6/1957  Berneis ............................ 260/610 B
3,459,810  8/1969  Chou ................................ 260/610
3,647,886  3/1972  Mead .............................. 260/610 B FOREIGN PATENTS OR APPLICATIONS
681,613  10/1952  Great Britain ................ 260/610 B Primary Examiner—Bernard Helfin
Assistant Examiner—W. B. Lone
Attorney, Agent, or Firm—T. H. Whalley; C. G. Reis

[57] ABSTRACT

A method of producing a hydrocarbyl hydroperoxide of the formula:

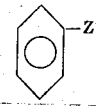

where Z is a radical selected from the group consisting of

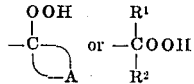

where A is $\alpha, \Omega$ alkylene of from three to eight carbons, $R^1$ and $R^2$ are n-alkyl and total 3 to 39 carbons consisting essentially of contacting with oxygen a hydrocarbon of the formula:

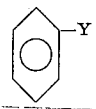

where Y is cycloalkyl of from four to nine carbons or

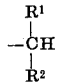

where $R^1$ and $R^2$ are as heretofore defined at a first reaction temperature and subsequently decreasing said temperature at least about 5°C. below said first temperature to a second reaction temperature.

7 Claims, No Drawings

MANUFACTURE OF HYDROCARBYL HYDROPEROXIDE

BACKGROUND OF INVENTION

One of the past methods for the manufacture of phenolic and ketonic compounds calls for the oxidation of alkyl substituted and cycloalkyl substituted aromatic compounds to form hydroperoxide derivatives further followed by the subjection of the hydroperoxide derivatives to acid catalyzed cleavage to obtain the desired phenolic and ketonic products. One of the continuing needs in respect to this method is for means of increasing the rate of formation of the hydroperoxide intermediate without concomitant decrease in selectivity and yield. Still another continuing need is the suppression of oxidation by-products in the hydroperoxide manufacture since they often serve as inhibitors to the final phenolic and ketonic preparation in addition to consuming the hydrocarbon reactant.

The prior methods in order to enhance yield, yield rate, selectivity and suppress by-product formation in the hydroperoxide manufacture employed alkalies, water and/or catalyst. Although these substances did function to improve yield, yield rate, selectivity and suppress by-product yields in varying degree, there was the undesirable necessity of removing them prior to the conversion of the hydroperoxide into the desired phenolic and ketonic products. This required extensive purification undesirably adding in a substantial manner to the manufacturing cost. Therefore, there was a need for a means of manufacturing hydroperoxides such as 1-phenylcyclohexyl hydroperoxide from hydrocarbons such as cyclohexylbenzene in improved yields, yield rate and selectivity with reduced by-product formation in the absence of materials such as alkalies, water and catalyst or any other added substances whose removal requires relatively time consuming, costly procedures.

SUMMARY OF INVENTION

I have discovered and this constitutes my invention a method of converting a hydrocarbon of the formula:

where Y is

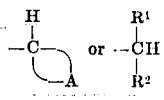

and A is $\alpha, \Omega$ alkylene of from three to eight carbons, and $R^1$ and $R^2$ are n-alkyl and total from 3 to 39 carbons into a corresponding hydrocarbyl hydroperoxide of the formula:

where Z is a monovalent radical of the formula:

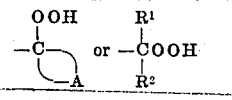

and where A, $R^1$ and $R^2$ are as heretofore defined in improved yield and selectivity or expressed in another manner at an improved yield rate for a given yield and in the absence of alkali, water and heterogeneous and homogeneous catalyst, said method consisting essentially of contacting said hydrocarbon with an oxygen containing gas utilizing multi-stage temperature and time sequence. The multi-stage temperature-time sequence unexpectedly improves yields and selectivity (yield rate) of the hydrocarbyl hydroperoxide product without the need of alkali, water and catalyst.

Hereinbefore and hereinafter selectivity is defined as:

Selectivity = Wt. of product/(Wt. of product + wt. by-products) × 100

DETAILED DESCRIPTION OF THE INVENTION

Specifically, the method of the invention consists of contacting the hydrocarbon as heretofore defined with a stoichiometric excess of oxygen containing gas advantageously in a mole ratio of at least about 1.1:1 and up to about 100:1 and higher oxygen to said hydrocarbon at a first reaction temperature, advantageously between about 130° and 150°C. desirably for a peroid of time of between about 1 and 3 hours, and subsequently reducing the temperature by at least about 5°C. while continuing the oxygen gas flow, advantageously to a temperature between about 105° and 125°C. desirably for a period of time of between about 2 and 4 hours, and recovering the formed hydrocarbyl hydroperoxide. Further, under preferred conditions, when operating in each temperature range the temperature is initially in the higher end of the temperature range and then subsequently reduced in said range within the time allotted to said range.

The reaction may be carried out in a single stirred tank reactor with stepwise reduction of temperature, or in several stirred tank reactors connected in series with each tank maintained at a different reaction temperature. In the latter embodiment, the hydrocarbon would be pumped continuously into the first and highest temperature reactor where it would be contacted by oxygen containing gas. Overflow from this reactor would pass continuously into a subsequent lower temperature reactor where additional air contacts the hydrocarbon. Any number of such series connected reactors could be used, depending upon the number of temperature levels desired.

The reaction can be conducted under atmospheric or elevated pressure, e.g., between about 0 and 100 psig. Atmospheric pressures normally prevail.

Specific examples of the hydrocarbon reactants contemplated herein are as follows:

where Y is cyclobutyl, cyclopentyl, cyclohexyl, cyclooctyl, cyclononyl and where Y is

and $R^1$ and $R^2$ are respectively methyl and ethyl, ethyl and ethyl, methyl and eicosyl, and octadecyl and eicosyl.

Specific examples of hydrocarbyl hydroperoxide products are as follows:

where Z is

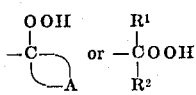

and A is $\alpha, \Omega$ propylene, $\alpha, \Omega$ butylene; $\alpha, \Omega$ pentylene; $\alpha, \Omega$ heptylene; and $\alpha, \Omega$ octylene and $R^1$ and $R^2$ are respectively methyl and ethyl, ethyl and ethyl, methyl and eicosyl, and octadecyl and eicosyl.

Examples of the oxygen containing gas contemplated herein are oxygen, air and synthetic mixtures of oxygen with inert gas such as oxygen-nitrogen mixtures containing between about 10 and 100 volume percent oxygen.

The hydrocarbyl hydroperoxide product can be purified by simple means such as distilling of unconsumed hydrocarbon reactant and separating out the hydrocarbon hydroperoxide product from the residue via selective extraction with lower liquid alkane such as n-pentane.

In the method of the invention the temperature may be reduced from one stage to a subsequent stage either gradually or stepwise, the specific rate of reducing primarily dependent on the size of the oxidation vessel and whether the reaction is run on a batchwise or continuous flow basis. In any case, the reduction is normally accomplished within a 2 hour period.

Since under the reaction conditions the reaction ingredient products are in the liquid and gaseous state, the use of inert liquid solvent such as chlorobenzene, benzene, fluorocarbons, to facilitate the reaction although feasible is not mandatory. Further, under preferred conditions, the reaction mixture is agitated. This can be accomplished with a mechanical stirring means and/or via the agitation caused by the passage of oxygen containing gas through the liquid reaction mixture. Still further, in order to facilitate the reaction, the oxygen containing gas is preferably introduced into the liquid reaction mixture, for example, via a sparger therein.

The rate of addition of oxygen in the form of oxygen containing gas is not critical provided the hydrocarbon reactant is kept saturated with oxygen and the oxygen-hydrocarbon reactant mixture is well stirred, so that the oxidation reaction rate does not depend upon diffusion of oxygen through the reaction medium. Flow rates of oxygen as low as 0.002 mole oxygen/minute/mole initial hydrocarbon reactant have been used successfully with good agitation.

In regard to the reason why the multi-stage temperature procedure unexpectedly improves yield and selectivity (yield rate) in the absence of catalyst, alkali and water, it is theorized that the initial high temperature range achieves a reasonable reaction rate, however, if this high range is maintained throughout the entire reaction period, the higher temperature will more than counteract the higher reaction rate in terms of breakdown of hydroperoxide product and increasing the production of oxidate by-products rather than the desired hydrperoxide product. It is, therefore, believed that once an initial amount of hydroperoxide product is produced this initial amount will catalyze the reaction in situ thereby permitting the reaction to be completed at a reduced temperature thereby reducing the tendency of the hydroperoxide to be decomposed and reducing the formation of hydroperoxide yield reducing by-products.

The following examples further illustrate the method of the invention but are not to be construed as limitations thereof.

EXAMPLE I

Cyclohexylbenzene in an amount of 400 grams was placed in a 1-liter glass reactor equipped with reflux condenser, fritted glass sparger and mechanical stirring device. The temperature was maintained at the desired level by means of an oil bath. A 50/50 volume percent oxygen-nitrogen mixture was sparged into the reactor at a rate of 0.5 liter/minute (0.00446 mole $O_2$/min./mole CHB). The initial temperature is 140°C. and maintained for 1 hour. Then the temperature was rapidly reduced (greater than 0.3°/min.) to 130°C. and maintained at this level for 2 hours and then further reduced to 120°C. and maintained for 3 hours and finally reduced to 110°C. and maintained for 3 hours. The progress of the oxidation was followed by taking samples and analyzing for hydroperoxide content by idiometric titration At the end of the 9 hour reaction period the 1-phenylcyclohexyl hydroperoxide content was 24.7 wt. percent and the selectivity of the oxidation to the hydroperoxide was 82.2 percent.

EXAMPLE II

Cyclohexylbenzene in an amount of 300 grams was oxidized in the apparatus described in Example I. Air was sparged into the reactor at a rate of 0.5 liter/minute (0.00249 mole $O_2$/min./mole CHB). The initial temperature of 130°C. was maintained for 3 hours with subsequent 3 hour periods at 125°C. and finally 3 hours at 120°C. At the end of the 9 hour reaction period 1-phenylcyclohexyl hydroperoxide concentration was 23.8 wt. percent and the selectivity 80.4 percent.

EXAMPLE III

This example is comparative and illustrates the reduced yield of hydroperoxide and selectivity when the reaction is limited to a one-stage high temperature.

Cyclohexylbenzene was oxidized in amount of 300 grams in the apparatus described in Example I. The air flow was maintained at 1 liter/minute (0.00933 mole $O_2$/min./mole CHB), and the temperature was maintained at 140°C. throughout the run. The run was continued for a peroid of 9 hours. The maximum concentration of 1-phenylcyclohexyl hydroperoxide attained during the 9 hour period was 17 wt. percent and a maximum selectivity of 49.2 percent after 3.5 hours. The continuation of the oxidation beyond the 3.5 hour peroid resulted in a reduced yield of hydroperoxide apparently caused by the decomposition of the hydroperoxide and the competing by-product formation.

EXAMPLE IV

This comparative example illustrates the disadvantage of operating solely at a one-stage low temperature.

In the apparatus described in Example I there was charged 238 grams of cyclohexylbenzene. The oxygen flow was set at 0.2 liter/minute (0.00600 mole $O_2$/min./mole CHB) and a temperature of 120°C. was maintained throughout the run. Only after 13 hours was a 1-phenylcyclohexyl hydroperoxide concentration and selectivity attained comparable to the results of Examples I and II, i.e., a yield of 24.7 wt. percent and a selectivity of 82.2 percent.

I claim:

1. A method of producing a hydrocarbyl hydroperoxide of the formula:

where Z is a radical selected from the group consisting of

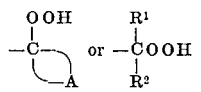

where A is $\alpha$, $\Omega$ alkylene of from three to eight carbons, $R^1$ and $R^2$ are n-alkyl and total 3 to 39 carbons consisting essentially of contacting a hydrocarbon of the formula:

where Y is cycloalkyl of from four to nine carbons or

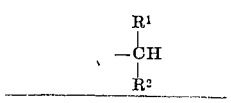

where $R^1$ and $R^2$ are as heretofore defined with a stoichiometric excess of oxygen containing gas at a first reaction temperature between 130° and 150°C. for a period of between about 1 and 3 hours and subsequently continuing said contacting at a second reaction temperature between 105° and 125°C. for a period of between about 2 and 4 hours.

2. A method of preparing a hydrocarbyl hydroperoxide of the formula:

where Z is a radical selected from the group consisting of

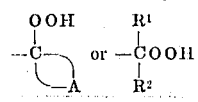

where A is $\alpha$, $\Omega$ alkylene of from three to eight carbons, $R^1$ and $R^2$ are n-alkyl and total 3 to 39 carbons consisting essentially of contacting a hydrocarbon of the formula:

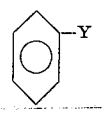

where Y is cycloalkyl of from four to nine carbons or

where $R^1$ and $R^2$ are as heretofore defined with an oxygen containing gas utilizing a mole ratio of oxygen to said hydrocarbon of at least about 1.1:1 at a first temperature between about 130° and 150°C. for a period of between about 1 and 3 hours and subsequently continuing said contacting at a second temperature of between about 105° and 125°C. for a period of between about 2 and 4 hours.

3. A method in accordance with claim 2 wherein said hydrocarbon is cyclohexylbenzene and said hydrocarbyl hydroperoxide is 1-phenylcyclohexyl hydroperoxide.

4. A method in accordance with claim 3 wherein said oxygen containing gas is oxygen.

5. A method in accordance with claim 3 wherein said oxygen containing gas is air.

6. A method in accordance with claim 3 wherein said oxygen containing gas is a mixture of oxygen and nitrogen.

7. A method in accordance with claim 3 wherein the final reaction mixture is sequentially fractionally distilled to remove cyclohexylbenzene as overhead followed by contacting the residue with a lower liquid alkane, separating the extract solution and removing said lower liquid alkane from said extract solution leaving purified 1-phenylcyclohexyl hydroperoxide as residue.

* * * * *